United States Patent
Woloszyk et al.

(10) Patent No.: US 6,651,003 B2
(45) Date of Patent: Nov. 18, 2003

(54) METHOD OF AUTOMATIC CONTINUOUS CALIBRATION FOR AN ELECTRIC COMPASS

(75) Inventors: Mark Woloszyk, Sterling Heights, MI (US); John Manfreda, Sterling Heights, MI (US); Robert Ford, Troy, MI (US); Shawn Haley, West Bloomfield, MI (US)

(73) Assignee: Innovative Design Solutions, Inc., Troy, MI (US)

( * ) Notice: Subject to any disclaimer, the term of this patent is extended or adjusted under 35 U.S.C. 154(b) by 0 days.

(21) Appl. No.: 09/918,197

(22) Filed: Jul. 30, 2001

(65) Prior Publication Data

US 2003/0023380 A1 Jan. 30, 2003

(51) Int. Cl.$^7$ .......................... G01C 21/26; G01C 17/38
(52) U.S. Cl. .......................................... 701/224; 33/356
(58) Field of Search ........................ 701/224; 33/355 R, 33/356–358, 361; 324/345, 244–246, 260

(56) References Cited

U.S. PATENT DOCUMENTS

| | | | |
|---|---|---|---|
| 4,030,204 A | 6/1977 | Edwards | 33/361 |
| 4,622,843 A | 11/1986 | Hormel | 73/1 E |
| 4,797,841 A | 1/1989 | Hatch | 364/571.04 |
| 4,953,305 A | 9/1990 | Van Lente et al. | 33/356 |
| 5,046,031 A | 9/1991 | Wanous | 364/571.02 |
| 5,161,311 A | 11/1992 | Esmer et al. | 33/356 |
| 5,187,872 A | 2/1993 | Dufour | 33/356 |
| 5,297,063 A | 3/1994 | Cage | 364/571.02 |
| 5,440,484 A | 8/1995 | Kao | 364/424.01 |
| 5,737,226 A | 4/1998 | Olson et al. | 701/224 |
| 5,802,727 A | 9/1998 | Blank et al. | 33/361 |
| 6,014,610 A | 1/2000 | Judge et al. | 702/92 |
| 6,047,237 A | 4/2000 | Michmerhuizen | 701/224 |
| 6,301,794 B1 * | 10/2001 | Parks et al. | 33/356 |

* cited by examiner

*Primary Examiner*—Thu Nguyen
(74) *Attorney, Agent, or Firm*—Dinnin & Dunn, P.C.

(57) ABSTRACT

An autocalibration method for use within an electronic compass in a vehicle is disclosed. The method includes steps of initializing variables and then retrieving sensor readings from at least two axis. The method then compares the compass tilt to a predetermined threshold. Next the method will determine if the sensor reading is a minimum or maximum for the current calibration cycle. Next the method will determine if the maximum value of the sensor readings is greater than the predetermined minimum spread. Then the method will calculate an offset value for each axis and calculate a sensor value for each axis. Then the method will calculate an azimuth value with the new sensor values and determine the heading using the azimuth.

18 Claims, 8 Drawing Sheets

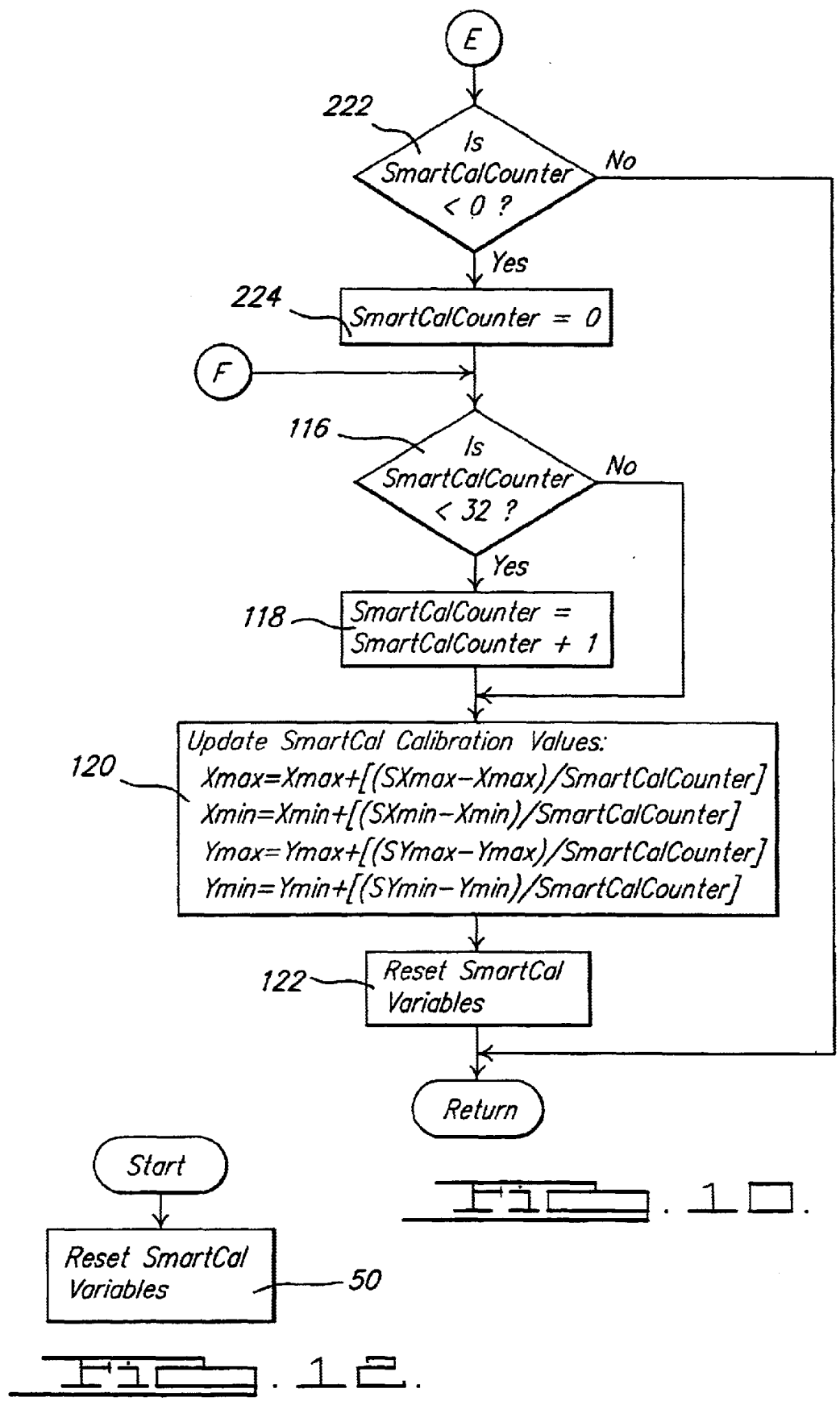

METHOD OF AUTOMATIC CONTINUOUS CALIBRATION FOR AN ELECTRIC COMPASS

BACKGROUND OF THE INVENTION

1. Field of the Invention

The present invention relates generally to electronic compasses for use in vehicles, and more particularly, relates to a method of automatic continuous calibration of an electronic compass for use in a vehicle.

2. Description of Related Art

Magnetic compasses are commonly used in vehicles, including land vehicles, boats, air craft and even by hikers, as an aide in direction finding and navigation. The popularity has increased for use of the electronic compasses in motor vehicles, in either the rearview mirror or on a separate overhead console unit. Meanwhile, the manufacturers of the vehicles are increasingly asking for more accurate and low cost compass products for their vehicles.

Generally speaking, vehicles use one of two compass products. The first is a two board system where a remote sensor board communicates through a display via a wiring harness. The second type is a single board system consisting of a sensor board which transmits the heading information digitally in various formats to a remote location via a wiring harness. Typically the sensor board contains a micro controller, a dual axis magnetic or magnetoresistive sensor and associated signal conditioning circuitry. Other types of sensors such as a flux gate sensor may also be utilized to sense the magnetic field, strength and direction of such field. The magnetoresistive sensor generally measures the earths magnetic field. The signal conditioning circuit then amplifies the voltage output of the magneto resistive sensor to a level optimum for the micro controllers' analog to digital converter. Once the readings are processed by the software the heading is determined and then transmitted via the wiring harness to the display board where they are processed by the software to determine the current heading.

Typically, electronic compasses operate by detecting the earth's magnetic field. However, they have an inherent problem that magnetic disturbances in the environment will affect the electronic compass readings and headings. Furthermore, any nearby electronic devices and ferrous objects will also affect the compass readings. Therefore, to accurately determine the heading, the compass must be able to compensate for these magnetic distortions which are found in every day use. Prior art devices have tried to compensate for the deviation of ferrous objects and magnetic distortions and/or disturbance but the accuracy is still not sufficient.

Therefore, there is a need in the art for an electronic compass that uses a calibration routine that is low in cost and provides a more accurate, stable and dependable updated compass heading, capable of compensating for ferrous objects and magnetic disturbances found in everyday use. Furthermore, due to the dynamic nature of the compass's magnetic environment there is a need for a compass calibration routine which does not depend on an extended history of past magnetic sensor data to determine its current movement. Also, there is a need for an adaptable compass calibration routine that can vary its rate of calibration according to the current magnetic environment thereby yielding more accuracy and dependability in a shorter period of operation.

SUMMARY OF THE INVENTION

One object of the present invention is to provide a novel continuous calibration routine for an electronic compass.

Another object of the present invention is to provide a continuous calibration routine that will continuously compensate for magnetic disturbances associated with electronic compasses.

Yet a further object of the present invention is to provide an electronic compass that is capable of increasing or decreasing the amount of filtered response used in the heading.

A further object of the present invention is to provide an electronic compass that includes two different sets of minimum and maximum values to ensure that the most accurate heading is achieved for the sensor readings and also weighted according to how many sensor readings have been taken.

A further object of the present invention is to provide an electronic compass that does not use an extended history of past sensor data to determine the compasses current movement, therefore allowing the compass to recalibrate more quickly and efficiently when operating in a dynamic magnetic environment.

A further object of the present invention is to provide a calibration method that is capable of varying the rate at which the calibration is updated in order to respond more quickly and accurately to changes in the local magnetic environment.

Still a further object of the present invention is to provide a calibration method that is highly adaptable through the adjustment of key parameters thereby allowing for accurate heading determination in various operating environments.

To achieve the foregoing objects an automatic continuous calibration method for use with an electronic compass is provided. The method includes initializing variables, and then retrieving sensor readings from at least two axis. The method further includes comparing compass tilt to a predetermined threshold. Then the method determines if the span of the sensor readings are greater than a predetermined minimum spread. Next the method obtains minimum and maximum sensor readings for the current calibration cycle. Next the method will update the current calibration based upon the minimum and maximum readings obtained during the current calibration cycle. The method will then calculate an offset and scaling value for each axis and will adjust the sensor readings by these values to obtain compensated sensor values for each axis. Then the method will calculate an azimuth value with the adjusted sensor values and finally determine the heading using the azimuth value.

One advantage of the present invention is that the method of continuous calibration will more accurately compensate for local changes in the magnetic disturbances associated with electronic compasses.

A further advantage of the present invention is that the calibration routine or method uses two separate sets of minimum and maximum values to determine if the compass has gone in a full circle and in determining the heading of the compass.

A further advantage of the present invention is that the method does not use an extended history of sensor data to determine the compasses current movement. Therefore, the compass is able to recalibrate itself more quickly, efficiently and rapidly, when operating in a dynamic magnetic environment that changes due to variations in stray/ambient magnetic fields and changes in the ferrous material near the compass, such as found in a vehicle.

A further advantage of the present invention is that the calibration method is capable of varying the rate at which the calibration is updated in order to respond more quickly and accurately to changes in the local magnetic environment.

A further advantage of the present invention is that by the adjustment of certain parameters the algorithm is highly adaptive to allow for accurate heading determination in various operating environments.

Other objects, features and advantages of the present invention will become apparent from the subsequent description and appended claims, taken in conjunction with the accompanying drawings.

BRIEF DESCRIPTION OF THE DRAWING(S)

FIG. 8 shows a block diagram of the smart cal routine continued.

FIG. 10 shows a block diagram continuation of the smart cal routine.

FIG. 12 shows a blocking diagram of the initialization routine.

DESCRIPTION OF THE PREFERRED EMBODIMENT(S)

Figure 1:
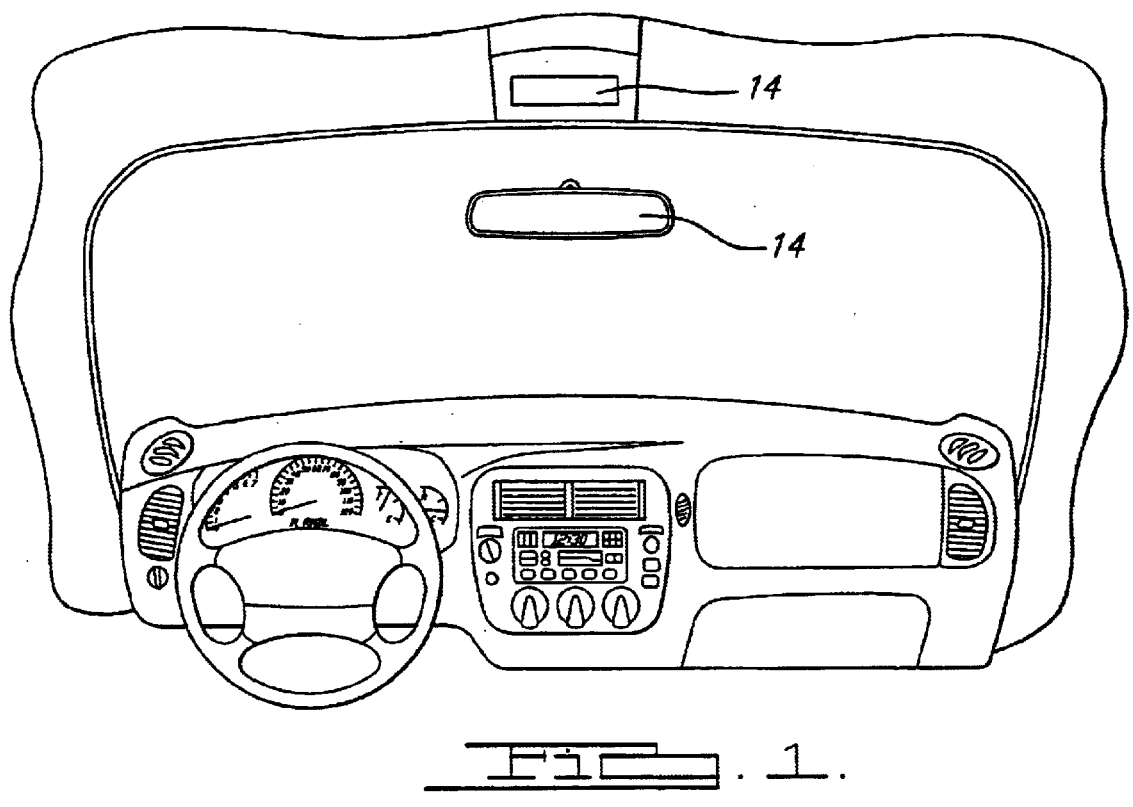
FIG. 1 shows a view of a compass in the console or rearview mirror of a vehicle.

Referring to the drawings, a method of continuous calibration for an electronic compass according to the present invention is shown. The continuous calibration method is used generally for electronic compasses in vehicles. However, it should be noted that the compasses can be used in hand-held situations, in air crafts, and marine craft depending on the need and the environment for the compass. A common automotive interior configuration is shown in FIG. 1, the electronic compass 14 is either placed within an overhead console or within the rear view mirror surface itself. The compass may be a single piece unit that contains all of the compass hardware and software in one unit. A second embodiment is a dual piece unit that would separate the magnetic sensor from the display device. The magnetic sensor and the associated signal conditioning circuitry would be located on one unit while the display device would be located on a second unit remote from the first unit. The dual unit configuration offers greater flexibility because the magnetic sensor can be placed in a location with minimal magnetic distortion and the hardware can have varying resolution while the data processing by the algorithm remains the same. However, it should be noted that regardless of the hardware resolution that maximum accuracy can be obtained for either a single unit compass or a dual unit compass.

Electronic compasses 14 generally operate by detecting the earth's magnetic field. As with any electronic device there is the inherent problem of magnetic disturbances in the environment effecting any readings by the electronic compass 14. Nearby electronic devices, ferrous objects and stray/ambient fields will effect the compass readings in an adverse manner. To accurately determine the heading of a compass 14, the compass must be able to compensate for the magnetic distortion of its own local environment. The use of the present invention's continuous calibration method is one such way to accurately determine the heading by taking into effect any compensation needed for magnetic distortion found in the local environment.

In the preferred embodiment the electronic compass 14 generally consists of the following hardware. A dual axis magnetic sensor 16 and any associated signal conditioning circuitry. The hardware also includes a micro controller 18 and an analog to digital converter. In the preferred embodiment the magnetic sensor 16 is a magneto resistive sensor used to measure the earth's magnetic field. It should be noted that there are several different technologies which are suitable for measuring the same magnetic field. These other alternate embodiments may include flux gate coils, micro electro mechanical machines and the like. Any of the above or any other device capable of measuring the earth's magnetic field may also be used to generate the initial magnetic readings.

The signal conditioning circuitry 20, 22 will amplify the output of the magnetic sensor 16 to a level suitable for the analog to digital converter to operate properly. The analog to digital converter will convert the analog signal to a digital signal which then is used by the algorithm described in our method herein to calibrate the compass and determine the compass direction and/or heading. The analog to digital converter may be incorporated into the micro controller, the magnetic sensor, or have a separate integrated circuit depending on the environment and cost limits associated with each compass unit. The analog to digital converter has varying resolution that will depend on the specific application of the compass and the operating location of the compass.

Figure 3:
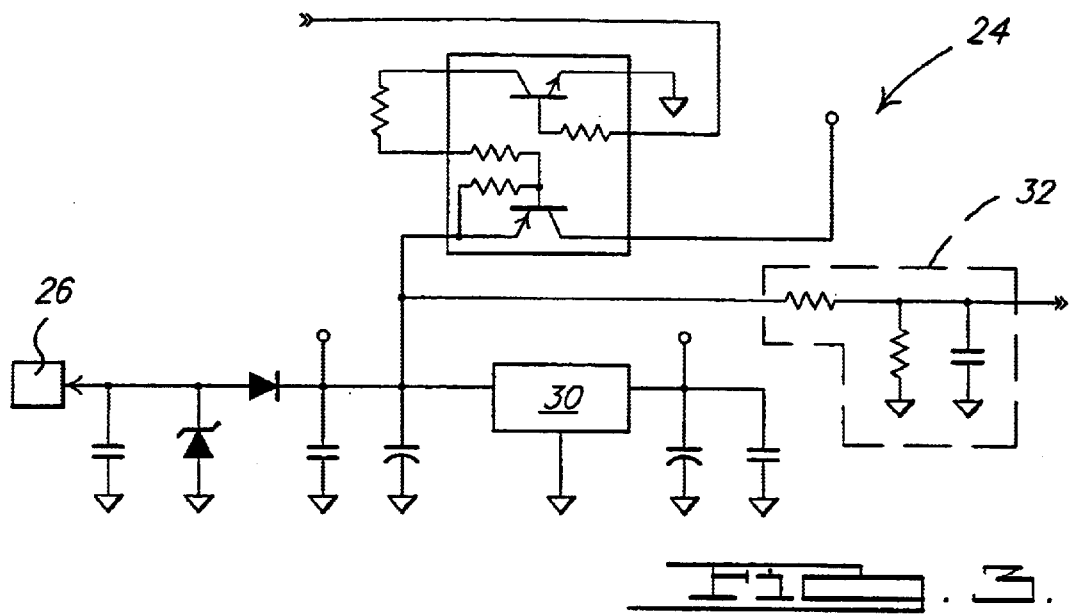
FIG. 3 shows a schematic of the power supply of the present invention.

The electronic compass hardware also includes additional circuitry such as a power supply circuit 24. The power supply circuit 24, as shown in FIG. 3, provides the power necessary to run the hardware and software of the compass. The power supply 24 generally connects to a battery 26 of the car and includes a series of resistors, diodes, and varistors. A second chip 30 is a voltage regulator that has an output that is conditioned by a series of capacitors to create and maintain the voltage necessary to operate the various sensors and other additional circuitry.

Figure 4:
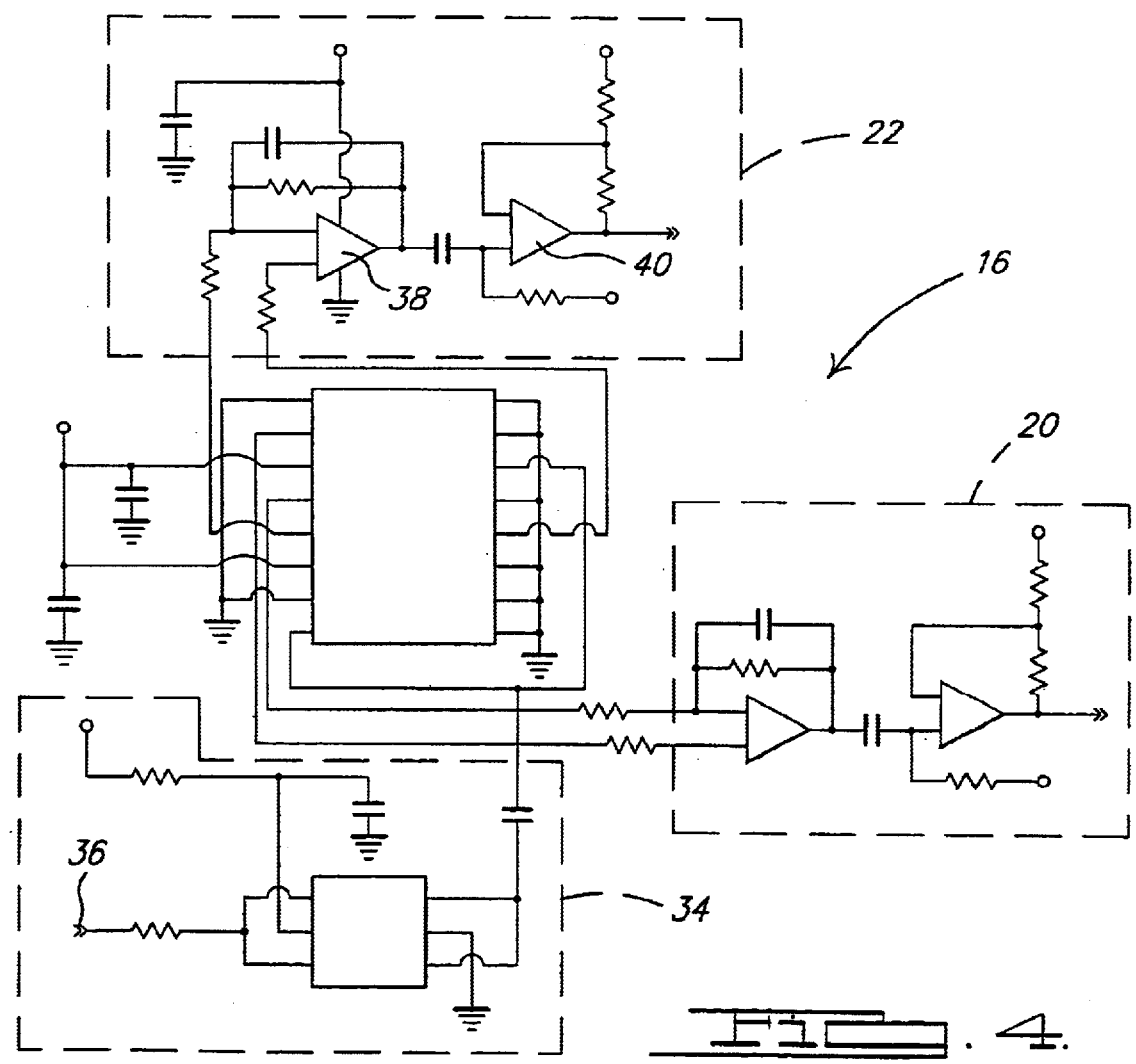
FIG. 4 shows a schematic of the magnetic sensor according to the present invention.

Additional support circuitry also includes circuitry to control the magnetic sensor 16. FIG. 4 shows a schematic for such a circuit. This circuit includes a set/reset signal 36 which is used to establish or alternate the polarity of the magnetic sensor 16. The magnetic sensor 16 will generate a signal that will go through two op amps 38, 40 creating a voltage increase such that the signal is amplified for both the X signal and the Y signal. These amplified voltages then enter the micro controller 18 for further conditioning. Each of the voltage amplifiers generally includes an op amp, a series of resistors and a capacitor.

Figure 2:
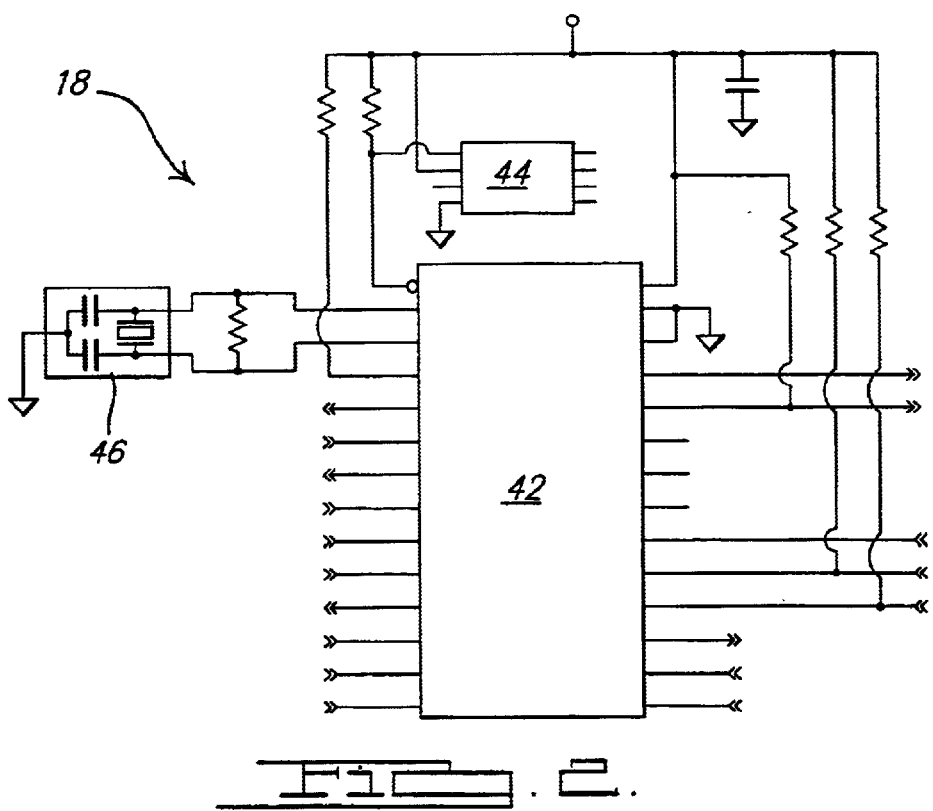
FIG. 2 shows a schematic of the micro controller according to the present invention.

FIG. 2 shows the schematic of the micro controller 18 according to the present invention. The micro controller 18 includes a first IC chip 42 and a second IC chip 44. The first IC chip 42 includes a plurality of pins to control I/O for various options which may be coupled with a compass indicator. These include inputs and outputs for controlling a display, outputs for driving temperature sensors arid tilt sensors, inputs for obtaining temperature and tilt data, inputs for switches for controlling the operation of the compass, any number of inputs which relate the current state of the vehicle such as door ajar inputs, vehicle ignition on/off signals, vehicle speed, headlamps on/off signal, etc. . . . and various other inputs and outputs used to operate a complete compass product. The first integrated circuit 42 is also connected to an oscillator circuit 46 that creates a signal with the necessary timing for the micro controller to operate. The micro controller 18 will condition the received sensor data and perform the necessary calculations to create a heading to display on the display unit for the driver to use. The compass heading information may be used to indicate the direction on a display such as a liquid crystal display (LCD), a vacuum fluorescent display (VFD), or air core gauge. It should also be noted that the heading information may be transmitted in various formats and that the information may be used by a receiver host for its own specific information such as satellite positioning, etc.

The electronic compass 14 also may contain the hardware necessary to provide a means for detecting maximum tilt threshold for the electronic compass. A liquid filled tilt sensor, or mercury switch, or any other suitable technology, may be used to determine if the magnetic sensor is exceeding a predetermined maximum degree of tilt for accurate sensor readings. The tilt information is used by the calibration method to test the validity of the sensor data from the magneto resistive sensor 16. In the preferred embodiment a two axis magnetic sensor is used. However, it should be noted that the method for calibrating magnetic sensor readings may be applied to a three axis sensor as well as a single axis sensor.

The continuous calibration method used to control the electronic compass 14 is an algorithm that is used to continuously compensate for the magnetic disturbances associated with electronic compasses. Magnetic sensor readings 64 are regularly taken at pre-specified intervals and are used to continuously update the compasses calibration. The continuous calibration method compensates for magnetic distortion, changes in gain and temperature effects, to achieve the most accurate compass readings for the local environment. To calibrate the compass 14, the sensor's output range must be found. Then, two compensating values, the scale factor and an offset value, are determined from this sensor range for each axis (X, Y) of the magnetic sensor 16. The scale factor specifies the ratio of each axis sensor reading span and is used to normalize the sensor readings for each axis. The offset specifies the bias of the sensor readings range and is used to re-center the sensor readings around zero for each axis. These scale factors and offsets are applied to each sensor reading before determining the current azimuth which is used to determine the current heading of the compass 14. The scale factors and offset values are also collectively known as calibration values.

Calibration of the electronic compass 14 requires determining the range of the magnetic sensor's 16 output. This may be accomplished by finding the minimum and maximum magnetic sensor values. Prior art manual calibration algorithms determine the range of the sensor's values only when prompted by the compass user. The prior art manual calibration procedure begins to determine the sensor's range only when instructed by the user and stops determining the sensor's range after a predetermined period of time or amount of sensor data. The user must be sure the compass is rotated through its full range of motion in order to collect enough valid data to accurately determine the sensor's range. The range found during this period is used to calibrate the compass. Therefore, with a manual calibration algorithm, the compass is calibrated according to sensor data that has been collected over a very short period of time. Further, the compass requires the user to initiate the calibration procedure and to perform the necessary movement to calibrate the compass. The algorithm described herein provides continuous calibration of an electronic compass. In contrast to the manual algorithm which only determines the sensor's range for a short period of time, the continuous calibration algorithm constantly monitors the sensor's range. Further, it allows for calibration without any specific action from the user.

To continuously update the calibration values the electronic compass must constantly gather minimum and maximum magnetic sensor values. The temporary or one cycle minimum and maximum values must be factored into a running average of the calibration minimum and maximums. However, the method must insure that valid one cycle minimum and maximums are factored into the calibration minimum and maximum values. These valid one cycle minimum and maximums are values that represent the magnetic sensors 16 true minimum and maximum output. These valid values are represented by an entire 360° circle and are not influenced by transient magnetic fields, temporary magnetic distortion in the compasses local environment, excessive tilting of the compass, etc. The running average of the calibration minimum and maximums of the axis (X, Y) must only use the true valid one cycle minimum and maximums by factoring in such values. The only way to determine if the one cycle minimum and maximum has truly been found is to ensure that the compass sensor rotates through all angles in its plane(s) of sensitivity. For a two axis sensor the electronic compass 14 must rotate 360° or in a full circle. Therefore, the electronic compass 14 must be able to detect when it has traveled in a full circle and factor the one cycle minimum and maximums found during that circle into the filtered calibration minimum and maximums values.

The continuous calibration method will determine if the compass has traveled in a full circle by calculating the azimuth based on the sensor readings. To insure an accurate azimuth calculation, the calibration values (scale factor and offset value) must be applied to the readings of the sensor in order to compensate for the various sources of error/distortion. The scale factor and offset values adjust the raw sensor reading as follows: Adjusted Reading=(Raw Reading−Offset)×Scale Factor. Upon initial use, the compass will not have learned its environment, i.e., gathered any minimum or maximum values from the sensor readings. Therefore, the appropriate scale factor and offsets to calculate an accurate azimuth are unknown. Hence, to determine if the compass 14 has traveled in a full circle a crude or rough azimuth calculation must be done. The rough azimuth will not have the accuracy of the true azimuth calculation but it only needs to be able to determine if the compass has completed a circle by checking that all eight cardinal octants, i.e., points of a compass such as north, northeast, east, southeast, south, southwest, west, northwest, have been passed through and registered by the method. The rough azimuth calculation is done by first assuming a default scale factor for each channel. In the preferred embodiment a scale factor of one, i.e., no scaling of raw readings will be used for both the X and Y channels. Next the offset value must be chosen. Assuming a default value of zero, i.e., no adjustment for offset, would produce unfavorable results. This occurs because with an offset of zero, it may not be possible to accurately detect when a circle has been traversed. It is possible to have all readings of a channel (X or Y) biased positively or negatively such that when using an assumed offset of zero you will not be able to accurately determine if the compass has traveled in a circle. Another case where an inaccurate offset value will prevent the rough azimuth from being calculated accurately enough to detect a circle is when the difference between the minimum and maximum is too small. If the difference is too small, the minimum and maximum not found over a significant enough portion of the circle, the calculated azimuth will appear to travel in a full circle even though the true azimuth travels only a small segment. Therefore, a more representative offset value must be calculated.

In the preferred embodiment, offset is the midpoint of the sensor's output range, offset=(max reading+min reading)/2. The offset indicates how much to bias each reading in the positive or negative direction. To give a more representative offset value, the compass will continually update its offset by calculating the maximum reading plus the minimum sensor reading divided by two for the values found up to a specific point. As the compasses travel gets closer to completing a full circle, the more accurate the rough offset value gets to the actual offset value. Hence, each time the method determines the compass has traveled in a full circle and finds the one cycle minimum and maximum values for that circle, these temporary minimum and maximums for each individual circle will be factored into the calibration values minimum and maximums that are used to calculate the accurate azimuth. How much these one cycle minimum and maximums are factored into the calibration minimum and maximums depends on how reliable the current calibration minimum and maximums are assessed to be. The reliability of the calibration values depend on the number of one cycle minimum and maximums that have been found up to that instance and also on how closely the latest one cycle minimum and maximums match the calibration minimum and maximums. Generally, the more one cycle minimum and maximums that have been found, the more reliable the calibration and the less heavily the most recent one cycle values will be factored into the filtered calibration values. However, depending on how the most recent one cycle values compare to the filtered calibration values, the calibration's reliability may be significantly changed and the most recent and possibly subsequent one cycle values may be factored into the filtered calibration values with more or less weight than typical.

The continuous calibration method will now be explained with the following variables being used:

Heading=the compass direction, rounded to a predetermined resolution. For example, the azimuth may be 63°, however if the method only indicates the 8 cardinal points the heading will be determined to be 45° or North East. Alternately, if the method only indicates the heading in 5° increments, the heading is determined to be 65°.

Xmax=the filtered calibration maximum sensor value on the X axis. This value is used to calculate the compensating values Xoffset and Xscale.

Xmin=the filtered calibration minimum sensor value on the X axis. This value is used to calculate the compensating values Xoffset and Xscale.

Ymax=the filtered calibration maximum sensor value on the Y axis. This value is used to calculate the compensating values Yoffset and Yscale.

Ymin=the filtered calibration minimum sensor value on the Y axis. This value is used to calculate the compensating values Yoffset and Yscale.

SXmax=a one cycle maximum X axis value found during one circle as determined by the continuous calibration method.

SXmin=a one cycle minimum X axis value found during one circle as determined by the continuous calibration method.

SYmax=a one cycle maximum Y value found during one circle as determined by the continuous calibration method.

SYmin=a one cycle minimum Y value found during one circle as determined by the continuous calibration method.

Xreading=X axis reading from the magnetic sensor.

Yreading=Y axis reading from the magnetic sensor.

Xoffset=adjustment value applied to the Xreading in order to compensate for ambient or stray magnetic fields.

Xscale=adjustment value applied to the Xreading in order to compensate for distortion in the earth's magnetic field.

Yoffset=adjustment value applied to the Yreading in order to compensate for ambient or stray magnetic fields.

Yscale=adjustment value applied to the Yreading in order to compensate for distortion in the earth's magnetic field.

Raw Azimuth=azimuth value calculated from the most recent set of magnetic sensor data.

Declination Angle=adjustment angle applied to the compass azimuth to compensate for heading errors based on geographic region.

Filtered Azimuth=filtered value of the compass direction determined as accurately as the hardware will allow.

Rough Filtered Azimuth=filtered rough azimuth used in the smart cat continuous calibration method. This value is used to determine when one of the eight cardinal point headings have been visited.

Headings Visited=variable used by the smart cal continuous calibration method to keep track of which of the eight cardinal point headings have been visited.

Xspread=absolute difference between the filtered sensor span and the one cycle sensor span for the X axis. Xspread=|(Xmax−Xmin)−(SXmax−SXmin)|.

Yspread=absolute difference between the filtered sensor span and the one cycle sensor span for the Y axis. Yspread=|(Ymax−Ymin)−(SYmax−SYmin)|.

Xshift=absolute difference between the filtered maximum sensor value and the one cycle maximum sensor value for the X axis. Xshift=|Xmax−SX max|.

Yshift=absolute difference between the filtered maximum sensor value and the one cycle maximum sensor value for the Y axis. Yshift=|Ymax−SYmax|.

SmartCalCounter=variable which establishes the weight with which the one cycle minimum and maximums are factored into the filtered calibration minimum and maximums. The value of SmartCalCounter is an indication of the reliability of the current calibration. The larger the value, the more reliable the calibration.

The continuous calibration method includes three sections. The first is the main program, the second is the calculate azimuth program, the third is the smart cal continuous calibration program. The main program will first in block 50 initialize all method variables. This includes the initialization of the smart cal continuous calibration method variables. These variables generally include SXmax and SYmax which are generally set to the smallest possible sensor reading; SXmin and SYmin which are generally set to the largest sensor reading, to insure the actual min/max's will be found. It should be noted that other initialization figures may be used depending on the compasses environment and the needs of the software programming.

Figure 5:
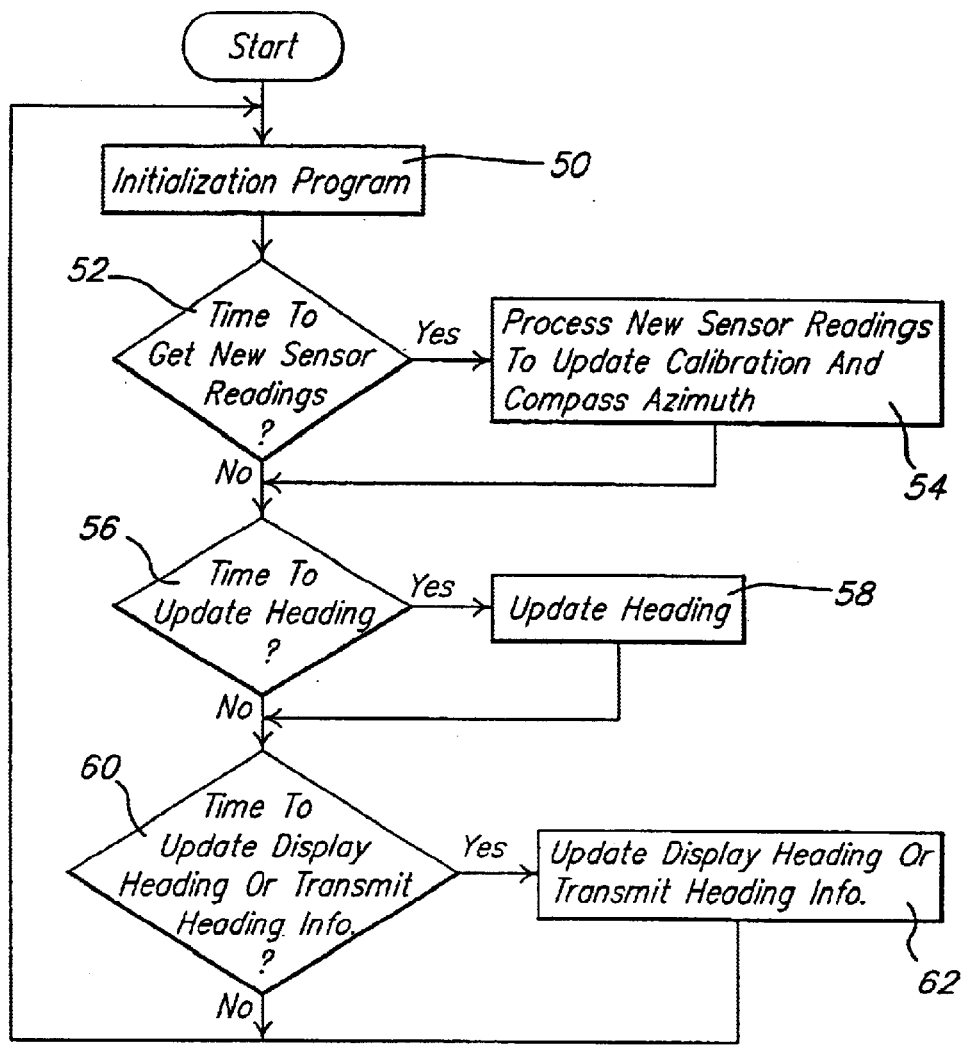
FIG. 5 shows a block diagram for the main program of the present invention.
Figure 11:
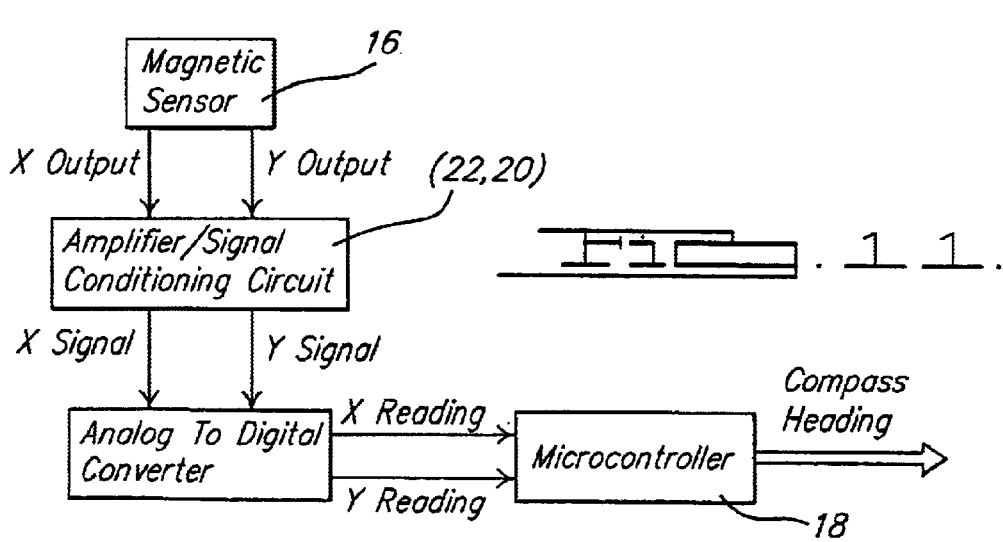
FIG. 11 shows a block diagram of the calibration routine.
Figure 5:
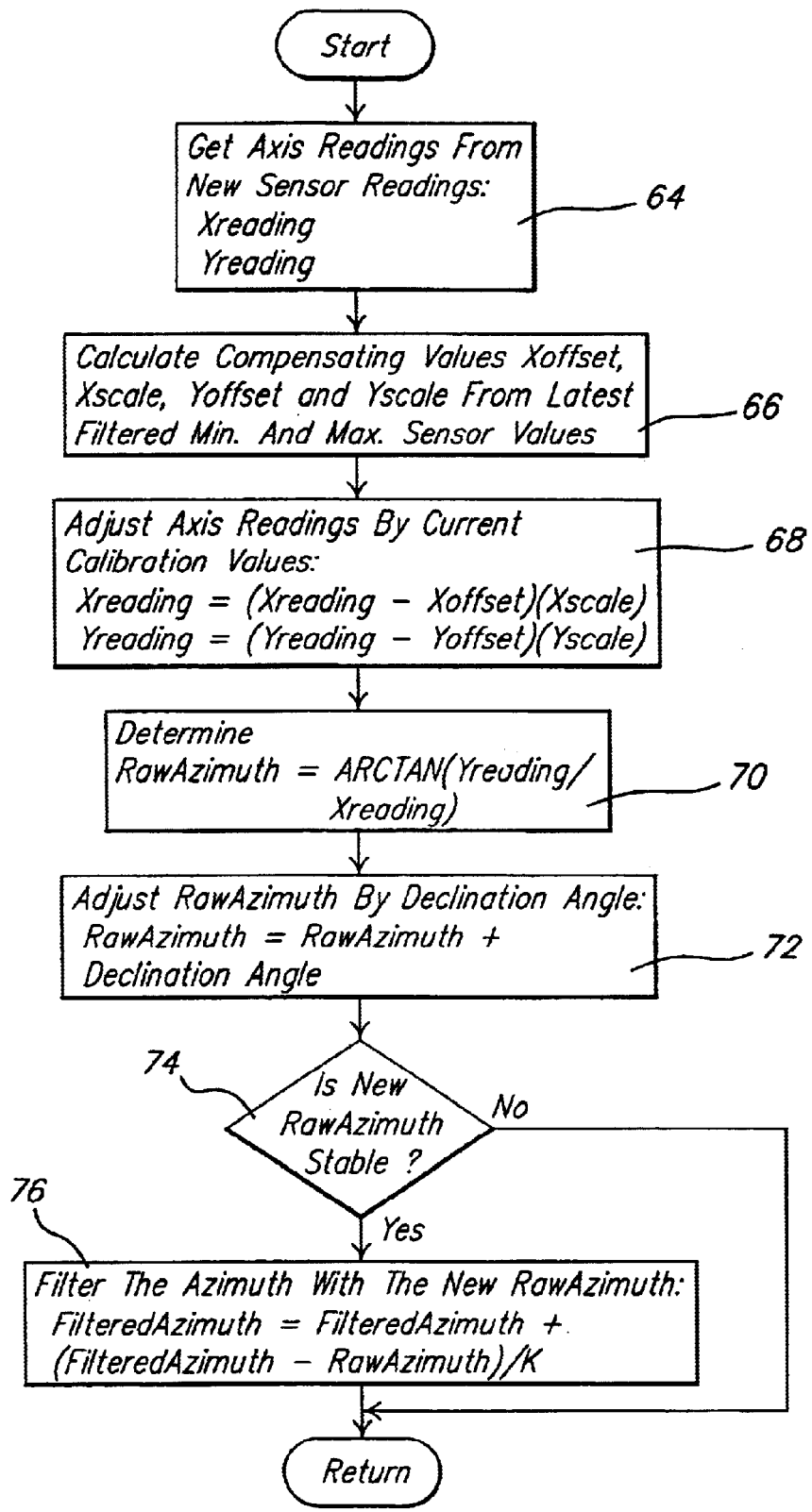

FIGS. 5–11 show the flow charts of the continuous calibration method. The main method as shown in FIG. 5 will perform a number of tests which will continually operate at varying time intervals. The main method after initialization will enter block 52 and determine if it is time to retrieve new sensor readings. Each time a new sensor reading is obtained the method enters block 54 and the compasses calibration is updated and the compass azimuth is calculated based upon the new sensor values. After the azimuth has been calculated with the new sensor readings, the program will enter block 56 and at predetermined intervals will enter block 58 and update the heading. After the heading is updated the method will enter block 60 and determine if the compass information will be communicated to the display. Generally speaking, the method will enter block 62 and update the display at regular time intervals as dictated by the interface scheme i.e., a display or transmitted to a receiver such that the new updated heading may be displayed in the passenger compartment to the vehicle driver.

Figure 6:
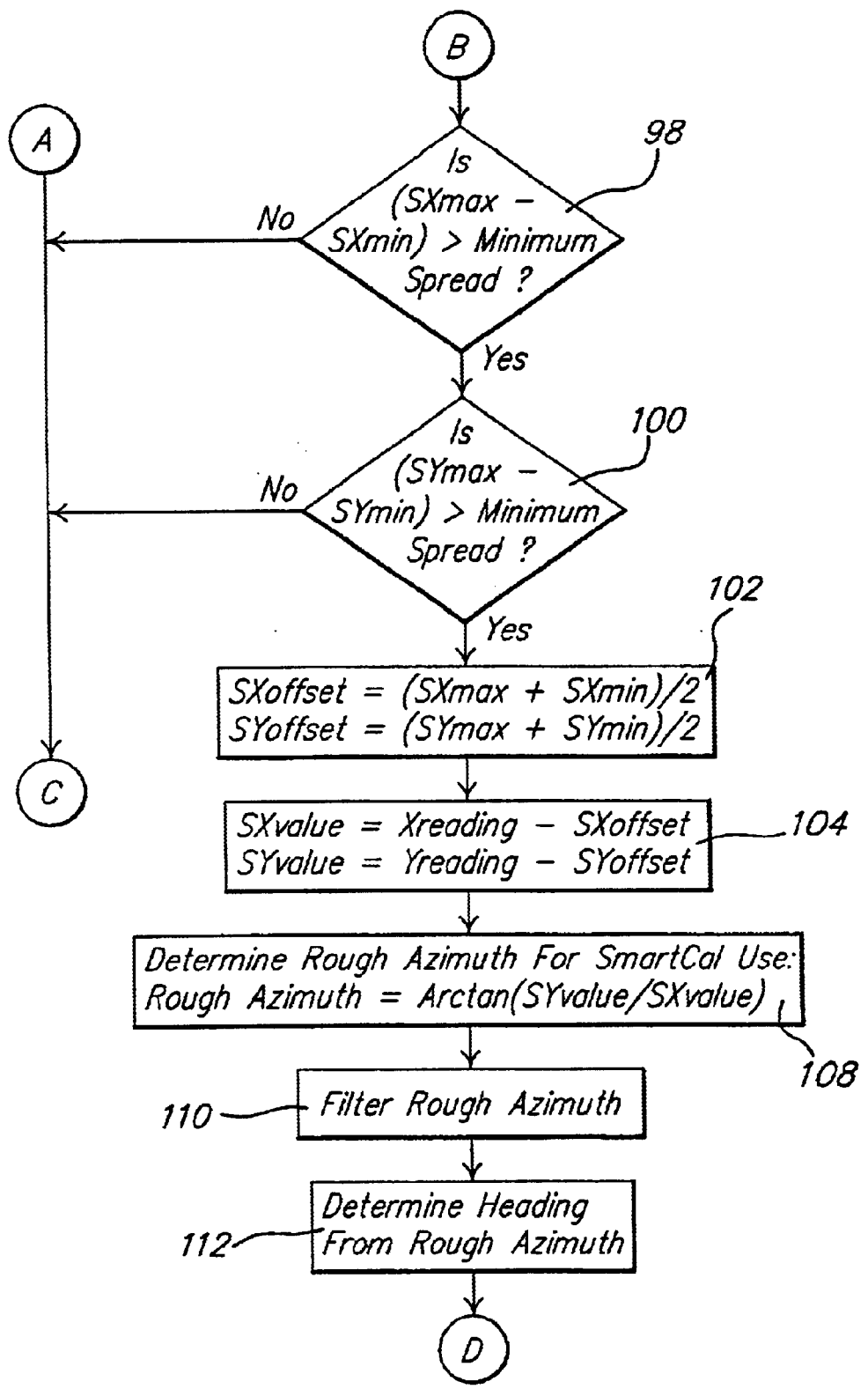
FIG. 6 shows a block diagram for calculating the azimuth routine.

As described in the main program, at blocks 52 and 54 after the retrieval of new sensor readings command is issued the compass will update the azimuth calculation. The azimuth calculation method is shown in FIG. 6. Block 64 starts the azimuth calculation by retrieving the axis readings Xreading and Yreading from the two channel sensor 16. Next in block 66 the compensating values Xoffset, Xscale, Yoffset and Yscale, are calculated from the filtered calibration minimum and maximum magnetic sensor values. Then in block 68 the Xreading and Yreading values are adjusted by these compensating values in order to adjust for any ferrous or magnetic disturbances. From these adjusted sensor readings the method enters block 70 and a raw azimuth is calculated, the raw azimuth is equal to the tangent of the ratio of one channel of the sensor to the other channel of the sensor, in our embodiment the arc tangent of the Yreading divided by the Xreading. The axis readings (X, Y) are adjusted by the current calibration values such that Xreading=(Xreading−Xoffset)·Xscale and Yreading=(Yreading−Yoffset)·Yscale. Once this instantaneous unfiltered azimuth, i.e., raw azimuth, is calculated it is then adjusted by a declination angle in block 72, which is used to compensate for the geographic location that the compass is in. It is well known in the art to use a declination angle adjustment to correct the compass heading. These declination angles have been made throughout the world and will adjust the compass heading to compensate for inaccuracies introduced by factors such as but not limited to the disparity between the magnetic north pole and the geographic north pole, iron ore deposits in the earth, the wandering of magnetic poles, changes in the earth's magnetic field, etc.

The azimuth method will then enter block 74 and perform a test on the new adjusted raw azimuth value to determine if the raw azimuth number is stable. This is done by testing the raw azimuth value against previous values for the same azimuth. If the value is found to be unstable, then the latest raw azimuth value will be rejected and it will not be used to adjust the filtered azimuth value. However, if the raw azimuth value is determined to be stable, then the method enters block 76 and the latest raw azimuth value will get processed into the filtered azimuth value. This is done via the following formula. The Filtered Azimuth=Filtered_Azimuth+(Filtered_Azimuth−Raw_Azimuth)/K. The value of the constant K will depend on the specific application of the compass. Generally speaking, the value of K is chosen to optimize the compasses response for the desired application. The Filtered Azimuth equation generally produces an RC like software filter and depending on the needs of the compass for a particular application, the filter response can be increased by decreasing K or may be slowed down by increasing the value of K. Once the Filtered Azimuth value is found, the method returns to the main program.

Figure 7:
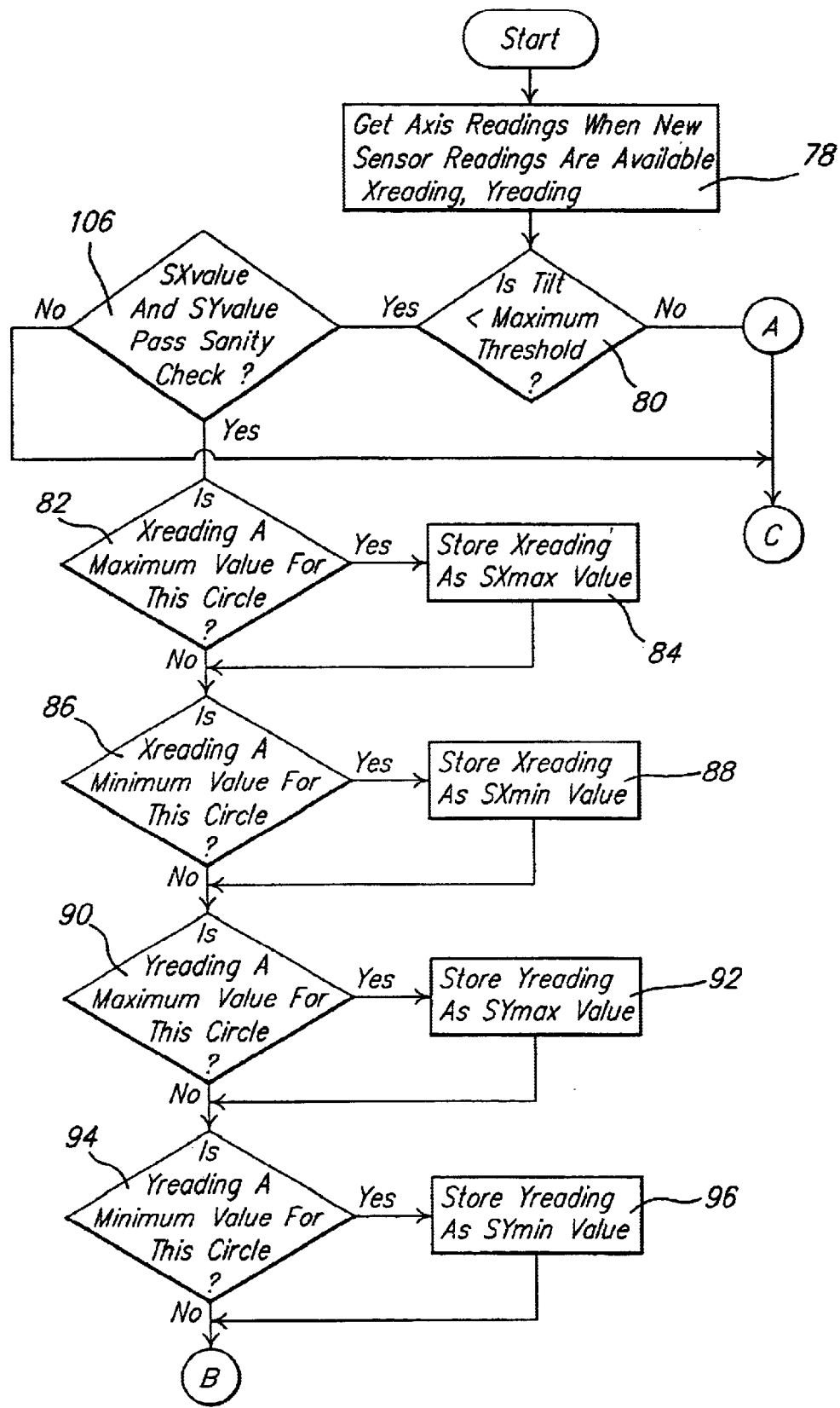
FIG. 7 shows a block diagram of the smart cal routine.
Figure 9:
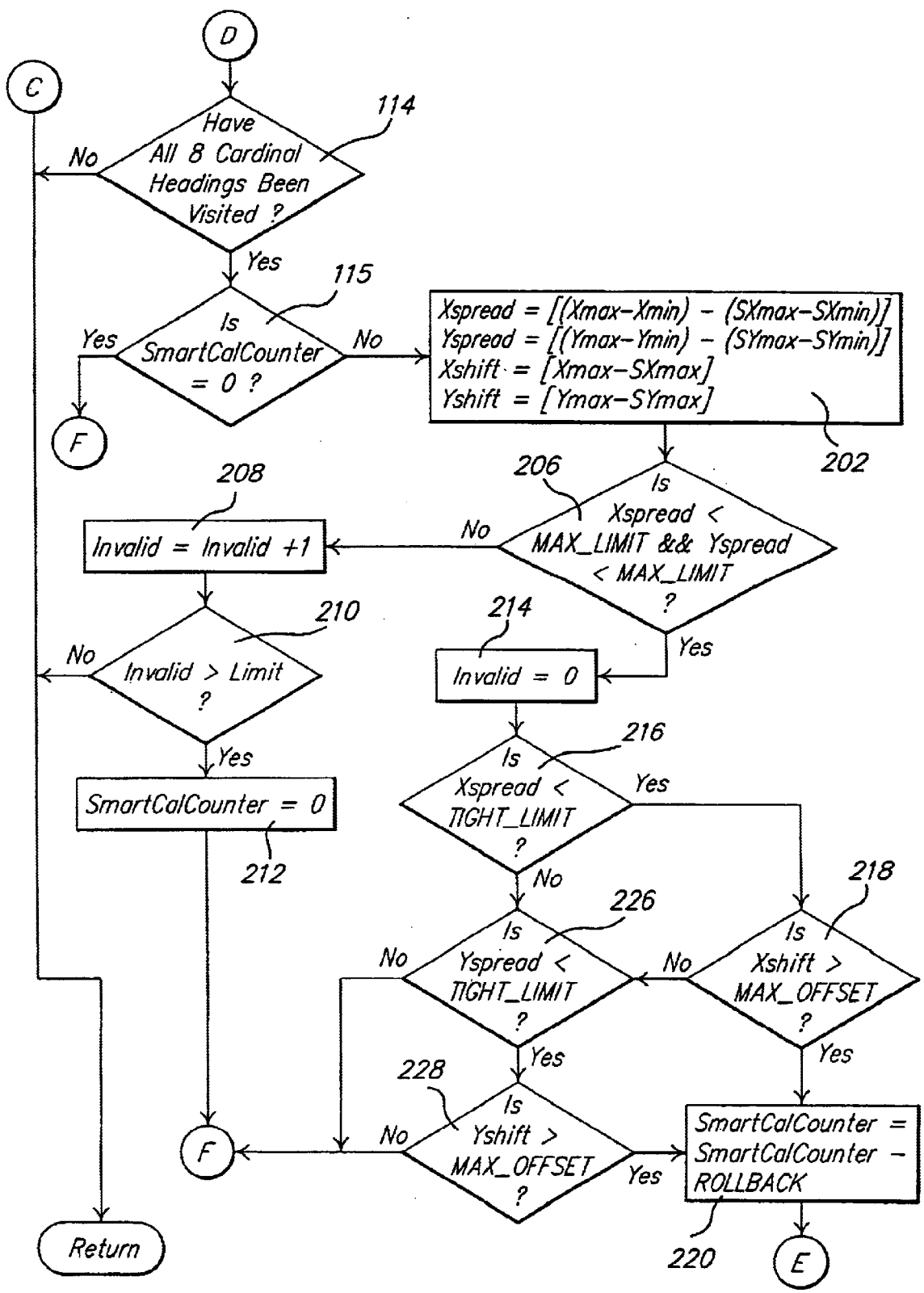
FIG. 9 shows a block diagram continuation of the smart cal routine.

As discussed in the main program when new sensor readings are found the azimuth must be updated along with the calibration values. Calibration values are updated as shown in FIGS. 7–9 with the smart cal continuous calibration method. The smart cal continuous calibration method is an algorithm that continually updates the compasses calibration each time a set of sensor readings is processed through the magneto resistive sensor 16. The method will process each set of sensor readings and update the calibration values according. The calibration values are a set of maximum and minimum sensor values that are used to calculate the compensating values which are applied to each set of instantaneous sensor readings to adjust for the various errors associated with electronic compasses in their operating environments. The method is continuously updating its calibration values by constantly gathering one cycle minimum and maximum magnetic sensor values when each sensor reading is received. A rough azimuth is calculated to determine when the compass 14 has traveled in a complete circle. The one cycle minimum and maximum values for that circle are then factored into the filtered calibration minimum and maximum values. This method will perform a series of tests to verify that the one cycle minimum and maximum values found for a given circle are representative of true minimum and maximum sensor values for a 360° arc. The one cycle minimum and maximum values for one individual circle is generally referred to as one cycle minimum and maximums and are weighted when factoring into the average calibration minimum and maximum values. The weighing of the one cycle values is based on the number of one cycle values that have been calculated thus far and also on how the one cycle values compare to the filtered calibration values.

As shown in the flow chart processing of the X and Y readings begin once they are received from the sensor. It should be noted that one cycle of the method will be complete when a full circle 360°, has been detected. After a complete circle has been detected, the cycle will be saved and stored and a new cycle will be started. It should further be noted that upon starting any new cycle of the smart cat continuous calibration method the variables for the smart cal continuous calibration method are reset to their initial states as discussed above. Thereafter each time a cycle of the method is completed the variables will be reset and the method will be started over. As discussed above, the SXmax and SYmax variables are set to the minimum possible values, in our preferred embodiment −32,768 while the SXmim and SYmin variables are set to the maximum possible values, in our preferred embodiment 32,767 this will insure that the first values obtained will be recorded as minimum and maximum values. Furthermore, the S_Filtered Azimuth variable is reset to indicate a valid Filtered Heading has not been calculated. It should be noted that a FLAG may be used for the filtered azimuth. Also, the Heading Visited variable will be set to indicate that no headings have yet been encountered.

As shown in FIG. 7 the smart cal method will retrieve new sensor readings Xreading and Yreading in block 78. Then in block 80 the method will first determine if the compass 14 is within an acceptable range of tilt along the X and Y axis of the magnetic sensor 16. An acceptable amount of tilt will depend on the application the compass 14 is used in and may change depending on the required accuracy needed for the compass 14. Generally speaking the tilt should be within 20° plus or minus from horizontal of the compass 14. The tilt must be checked to insure that the sensor readings used to determine the calibration values are valid. Any tilting of the sensor 16 can significantly change the sensors output and thus give misleading or erroneous azimuth readings if the values are processed normally. If a tilt effected sensor value is incorporated into the calibration values it can significantly degrade the compass' calibration. This would adversely effect the true value of typical sensor values during normal operation. If it is determined that the tilt is not within the acceptable range, the sensor readings will not be used to update the calibration and the processing of the latest sensor values will be terminated and the method will be returned to the main program. However, if the tilt is within the acceptable range, then the method will continue to process the sensor values in block 82. The method then enters block 106 and the readings for both the X and Y axis of the sensor are tested to determine if these readings are valid. This so called "sanity check" can be anything from comparing the current values to some past values to verify the data range or rate of change of data or to perform any other number of tests to determine that the new sensor readings fall within an acceptable range. If the readings of X reading or Y reading are determined not to be valid, the method will terminate the processing of the latest sensor values and control will be returned to the main program. When new sensor readings are available for processing, the calibration cycle will continue.

It should be noted that during the smart cal continuous calibration method two different sets of minimum and maximum values are used. The minimum and maximum values are recorded each time it is determined that the compass has traveled in a complete circle. These minimum and maximums are referred to as one cycle minimum and maximums. This set of one cycle minimum and maximum values are found in one complete operation of the continuous calibration algorithm. The second set of minimum and maximums are the filtered calibration minimum and maximums. Each one cycle minimum and maximum is factored into the filtered calibration minimum and maximums to get a weighted average of the one cycle minimum and maximums from each cycle.

After the method determines if the set of sensor readings pass the sanity check each of the sensor readings will be tested to determine if it is a minimum or maximum for the particular X or Y axis. In block 82 if the Xreading is found to be a maximum value for the respective circle it will be stored as SXmax in block 84. If the Xreading is found to be the minimum for the circle it will be stored as SXmin in block 88. Furthermore, in block 90 if the Yreading is found to be a maximum value for this circle it will be stored in SYmax in block 92 while if in block 94 the Yreading is found to be a minimum value for this circle it will be stored in SYmin in block 96.

The method will then in blocks 98 and 100 perform a check to determine if the sensor readings taken for the present cycle of the algorithm exceeds a predetermined minimum span or spread. The span is typically chosen based upon what a minimum span of sensor output would be for a properly functioning compass in a particular application. In our case the preferred span is approximately 167 mgauss for a typical eight point in vehicle compass. However, it should be noted that any other span may be used depending on the particular application of the electronic compass. The minimum output span will be looked for on both channels X and Y of the sensor, this will enable the method to determine if a sufficient portion of the circle has been traversed in order to begin tracking which headings have been visited by the compass. Prior to traversing a sufficient portion of the circle to satisfy the minimum span criteria, the one cycle minimum and maximum values used to adjust the sensor readings are not reliable enough to be used to calculate a reliable rough heading. Therefore, before this minimum span is found for any one cycle of the algorithm the rough heading calculation will be unreliable and may oscillate unacceptably because the sensor readings are being adjusted by unreliable compensating values. Hence, the rough azimuth calculated from these values would indicate that the compass is visiting headings which in fact it is not visiting. This may cause the method to erroneously determine that the compass has traversed all headings when it actually has not. This then enables the one cycle minimum/maximums that have been found to that point to be factored into what is then a faulty calibration minimum/maximum values that are used to calculate the accurate azimuth. These one cycle minimum and maximums will not be indicative of what the true one cycle minimum or maximum would have been had the entire circle actually been traversed. Thus, having the method test to determine that a minimum spread has been achieved for each channel (X, Y) of the sensor 16 will eliminate the use of bad one cycle minimum and maximums that could potentially only cover a small portion of a circle and not a full 360°. This will therefore remove any possibility of degrading the accuracy of the filtered calibration minimum/maximums used to calculate the calibration values for the accurate azimuth. If the minimum span is not present on both the X and Y channel, the method will return back to the main program and pause until new sensor readings are available to process. Once the minimum span has been found on both the X and Y channels then the method will continue on to block 102.

After verifying the minimum spread on both the X and Y channel, the current cycle offset which is used to adjust the sensor readings when determining the rough azimuth must be calculated as shown in block 102. This offset is calculated every time a new sensor reading is processed. The SXoffset=(SXmax+SXmin)/2 while SYoffset=(SYmax+SYmin)/2. With the offset being calculated every time a new sensor reading is processed, this allows for maximum adaptivity to the local environment of the compass. This method also insures that the offset value is only based on sensor data from the current circle which insures that the calculation of the rough azimuth, and whether or not the compass has traveled in a circle, is not dependent on past sensor data. The rough azimuth calculation and whether the compass has traveled in a complete circle is determined solely from the current circle or cycle of the method. This gives the electronic compass great adaptability to rapid changes in the local environment. Other prior art systems tend to use varying degrees of history of past sensor data to determine the compasses current movement. This creates a problem in that a change in the local environment of the compass can cause the compass to erroneously determine its movement in the local environment because it is using calibration values that represent the old environment in which it was operating. Therefore, the continuous calibration method described herein does not use any extended history of past sensor data to determine the compasses current movement and therefore it is better able to adapt to changes in the local environment of the electronic compass.

After the method determines the new SXoffset and SYoffset for the current cycle it then enters block 104 and adjusts the latest sensor readings by the offset values just calculated. This is done by creating SX value which equals Xreading minus SXoffset and creating SY_value which equals Yreading minus SYoffset. The rough azimuth is calculated by taking the arc tangent of SY_Value divided by SX_Value. This new rough azimuth value is then factored into the filtered rough azimuth value in block 110 in the same manner as described above for the accurate filtered azimuth. The method then in block 112 will take this filtered rough azimuth value and calculate a heading and store it in the variable Headings_Visited, this variable tracks which of the headings have been visited by the compass. The heading may be anyone of the eight cardinal point headings, north, northeast, east, southeast, south, southwest, west, and northwest.

The method will next enter block 114 and determine if all eight cardinal points have been visited by the compass 14 thus indicating that the compass has traveled in a full circle. If all eight of the headings have not been visited, the method will loop back to the main program and wait until new sensor readings are available to process. If all of the headings have been visited, which indicates a full circle has been traversed, the method enters block 115 where the newly acquired one cycle minimum and maximum values are evaluated. Based on the number of one cycle values already found and comparisons of the current one cycle values to the filtered calibration values, the one cycle values are filtered into the calibration values by differing amounts.

The preferred method for determining the weight with which the one cycle values are factored into the filtered calibration values is a variable which will be referred to as SmartCalCounter. The SmartCalCounter is an indication of the reliability of the compass's 14 calibration. Generally, the SmartCalCounter is incremented each time a new set of one cycle minimum and maximums are filtered into the calibration minimum and maximums. Generally, the more one cycle minimum and maximums that have been found the larger the SmartCalCounter, and hence, the more reliable the performance of the compass 14. A SmartCalCounter equal to 0 indicates that the compass essentially has no calibration. Generally, the SmartCalCounter is incremented each time a new set of one cycle minimum and maximums are filtered in. The SmartCalCounter may occasionally be reduced in value to indicate that the reliability of the calibration has been reduced. The method compares the newly acquired one cycle values to the filtered calibration values and determines if the comparisons increase or decrease the reliability of the calibration. The SmartCalCounter is incremented or decremented according to the comparison's above. In the preferred embodiment the method specifically seeks to determine if the new one cycle data span is within the general range of the filtered calibration data span and also if a DC magnetic field shift has occurred. Based on these criteria the SmartCalCounter is appropriately updated to reflect the assessed reliability of the calibration and the one cycle data is factored into the filtered calibration data. It should be noted that general similarity between the one cycle span and the calibration span and a DC magnetic field shift are not the only criteria which may be used to evaluate and assess the reliability of the compass's calibration. A number of other tests and comparisons may also be used to evaluate and assess the reliability of the compass's calibration.

The evaluation of the most recent one cycle values and updating of the SmartCalCounter is started in block 115. Block 115 begins the assessment by testing the value of the SmartCalCounter. If the SmartCalCounter is 0, indicating that the current compass calibration values are completely unreliable, then the method proceeds to block 116 and the one cycle data is filtered into the calibration data with maximum weight. If the SmartCalCounter is not 0, then a spread and shift value is computed for each axis in block 202. The spread for a given axis is the difference between the one cycle data span and the filtered calibration data span. The X axis span for the one cycle data is SXmax–SXmin. The X axis span for the filtered calibration data is Xmax–Xmin. Therefore, the X axis spread is Xspread=|(Xmax–Xmin)–(SXmax–SXmin)|. Likewise, the Y axis spread is Yspread=|(Ymax–Ymin)–(SYmax–SYmin)|. The shift for a given axis is the difference between the one cycle data offset and the filtered calibration data offset. For the purposes here, the X axis shift can be computed as Xshift=|Xmax–SXmax|. Likewise, the Y axis shift can be computed as Yshift=|Ymax–SYmax|.

The method uses each axis spread and shift values to determine if the latest one cycle values are similar to the filtered calibration values. If the one cycle spreads are substantially different, then the one cycle values will not be filtered into the calibration values and the SmartCalCounter will not be incremented. It is assumed that the large difference between the one cycle span and the calibration span is due to erroneous data and therefore this set of one cycle values is ignored. If a number of consecutive one cycle spans have differed substantially from the filtered calibration spans, then the SmartCalCounter will be reset to 0, indicating that the calibration is unreliable, and the one cycle data will be factored into the filtered calibration values with the heaviest weight. If the latest one cycle values are generally similar to the filtered calibration values, then the one cycles values are next tested to determine if a DC magnetic field shift has occurred on either axis. If a DC magnetic field shift is not detected, then the SmartCalCounter is incremented and the latest one cycle values are filtered into the calibration values with the usual weight. If a DC magnetic field shift is detected, then the SmartCalCounter is decremented by a predetermined amount. Then the current and subsequent one cycle values are filtered into the calibration values with a greater weight than normal.

The evaluation of the spread and shift of the latest one cycle values begins at block 206. The axis spreads are tested to determine if both are within a predefined limit labeled MAX_LIMIT. The spread of a particular axis is the difference in span between the current one cycle data and the filtered calibration data. The one cycle span indicates the magnetic distortion and gain found for a particular axis during the most recent circle traversed. The filtered calibration span indicates the average magnetic distortion and gain found for all circles traversed up to that point. Therefore, if the difference between the one cycle span and the calibration span is significant, this implies that the magnetic distortion or the gain has recently changed significantly. The MAX_LIMIT that the axis spreads are compared to is chosen such that if the spread of a particular axis is below the limit, then the axis' magnetic distortion has not changed dramatically. The actual value of this limit will depend on the specific application of the compass 14. If either axis' spread is greater than the MAX_LIMIT, indicating that the magnetic distortion has changed recently, then a variable (INVALID) is incremented in block 208 to track the number of successive times that at least one of the axis is greater than the maximum spread limit. Next this tracking variable is tested in block 210 to determine if it exceeds a predetermined limit. The actual value of this limit will depend on the specific application of the compass 14. If the value is less than the limit, then the method terminates this cycle so that this latest one cycle data is not filtered into the calibration data. If the value is greater than the limit, block 212 resets the SmartCalCounter to 0. This has the effect of factoring in the latest one cycle data with the most weight possible. The method proceeds to block 116 where the one cycle data is filtered into the calibration values.

If the test at block 206 determines that both axis spreads are less than the MAX_LIMIT, then the method proceeds to block 214 where the variable (INVALID), that tracks the number of times the test failed, is cleared to 0. Next, the method tries to determine if a DC magnetic shift has occurred. Block 216 tests the X axis spread against a second narrower limit labeled TIGHT LIMIT. The tight limit is chosen such that it represents a relatively small difference in the spans of the latest one cycle values and the filtered calibration values. This tighter limit is used to test if the latest data's span matches closely to the previous filtered data's span. If the X axis spread is greater than the TIGHT_LIMIT, the method proceeds to block 226 to begin testing the Y axis for a DC shift. If the X axis spread is less than the TIGHT_LIMIT, the X axis shift is next tested in block 218. If the X axis shift is greater than the maximum shift limit, labeled MAX_OFFSET, then a DC shift has been detected and the method proceeds to block 220. The maximum shift limit is chosen based on the magnitude of the DC field in which the compass 14 is to respond to. Block 220 decrements the SmartCalCounter by a predetermined amount ROLLBACK to indicate a reduced reliability in the calibration values. Decreasing the SmartCalCounter causes the current and subsequent one cycle values to be factored into the filtered calibration values with more weight than usual. If block 218 determines that the X axis shift is less than the maximum shift limit, then no DC shift was found and the method proceeds to block 226 where the Y axis spread is compared to the narrower spread limit. If the Y axis spread is greater than TIGHT_LIMIT then no DC shift was detected the method proceeds to block 116 where the one cycle data will be factored into the filtered calibration data with normal weight. If the Y axis spread is less than TIGHT_LIMIT, the Y axis shift is next tested in block 228. If the Y axis shift is less than the maximum shift limit MAX_OFFSET, then the method proceeds to block 116 and the one cycle data will be factored into the filtered calibration data with normal weight. If the Y axis shift is greater than the MAX_OFFSET, then a DC shift has been detected and the method proceeds to block 220. Blocks 222 and 224 are used to ensure that the SmartCalCounter can not be decremented below 0.

After the evaluation of the most recent one cycle minimum and maximums and updating SmartCalCounter accordingly, the method determines in block 116 if the SmartCalCounter is less than the predetermined value which in our preferred embodiment is thirty two. It should be noted that the SmartCalCounter can be limited to any predetermined number, this allows flexibility in setting the minimum amount that a one cycle can be weighed by. If the SmartCalCounter is greater than thirty two, the SmartCalCounter will not be updated further and the method will enter block 120. If the SmartCalCounter is less than thirty two, then the method will increment SmartCalCounter in block 118. In block 120 the one cycle values are weighted according to the current SmartCalCounter value and factored into the filtered calibration values. The formula for determining these new filtered calibration minimum and maximum values are as follows:

Xmax=Xmax+[(SXmax−Xmax)/SmartCalCounter]
Xmin=Xmin+[(SXmin−X min)/SmartCalCounter]
Xmax=Ymax+[(SYmax−Ymax)/SmartCalCounter]
Ymin=Ymin+[(SYmin−Ymin)/SmartCalCounter]

The amount of weight the most recent one cycle minimum and maximums are factored into the filtered calibration minimums and maximums depends on the value of SmartCalCounter. SmartCalCounter is an indication of the reliability of the calibration values. The larger the SmartCalCounter value, the higher the assessed reliability of the calibration, the less weight the one cycle values are weighted with when factoring into the filtered calibration values. The smaller the SmartCalCounter value, the lower the assessed reliability of the calibration, the more weight the one cycle values are weighted with when factoring into the filtered calibration values. By using the SmartCalCounter to determine the amount of filtering, the algorithm can dynamically change the rate at which the calibration is updated. When the reliability of the calibration is low, new data will be filtered in more aggressively so that the calibration values can update more quickly. When the reliability of the calibration is high, the new data will be filtered in less aggressively so that the calibration values will change more slowly and dependably. This ability to vary the rate at which the calibration is updated allows the compass to recalibrate quickly when the local magnetic environment changes and yet also allows the compass to calibrate slowly when the magnetic environment is stable. The continuous calibration method variables are then reset back to their initial state to prepare for a new one cycle algorithm in block 122 and thereafter the method will return to the main program. It should be noted that by selecting the values of the parameters ROLLBACK, MAX_LIMIT, TIGHT_LIMIT and MAX_OFFSET the algorithm described herein can be tailored to provide accurate heading determination in widely varying dynamic magnetic environments.

The present invention has been described in an illustrative manner, it is to be understood that the terminology which has been used is intended to be in the nature of words of description rather than of limitation.

Any modifications and variations of the present invention are possible in light of the above teachings. Therefore, within the scope of the appended claims, the present invention may be practiced otherwise than as specifically described.

What is claimed is:

1. An autocalibration method for use with an electronic compass in a vehicle, said method including the steps of:

initializing variables;

retrieving sensor readings from at least two axis;

updating calibration based on said sensor readings;

calculating a raw azimuth wit calibration adjusted sensor readings;

adjusting said raw azimuth by a declination angle;

filtering said raw azimuth with a previously filtered azimuth to obtain a filtered azimuth;

updating a first heading from said filtered azimuth; and determining if a display needs said updated first heading transferred thereto.

2. The method of claim 1 wherein the step of updating calibration further includes the steps of:

comparing compass tilt to a predetermined threshold to verify the compass is within a predetermined range from horizontal;

determining if said sensor readings are valid;

determining if said sensor reading is a minimum or maximum for the current calibration cycle;

determining if a spread of each axis is greater than a predetermined minimum spread;

calculating an offset value for each axis;

calculating a sensor value by adjusting said sensor readings with said offset value for each axis;

calculating a rough azimuth with said sensor values;

determining a second heading using said rough azimuth; and determining if eight consecutive cardinal headings have been sensed.

3. The method of claim 2 further including the step of comparing a cycle of axis data with a predetermined value and updating a calibration counter based on said comparison of a cycle of data with said predetermined value and on a number of said cycle data processed.

4. The method of claim 3 further including the step of updating calibration values for the compass.

5. The method of claim 1 wherein said step of calculating a raw azimuth has the form of the Arctan of the axis readings.

6. An autocalibration method for use in an electronic compass in a vehicle, said method including the steps of:

initializing variables used to calibrate a heading;

retrieving sensor readings from at least two axis;

updating calibration and azimuth values with said sensor readings;

calculating an offset value for each axis, said offsets are calculated with each new valid sensor reading for the current cycle as a function of the maximum and minimum values of the axis in the cycle;

adjusting each axis value with said axis offset value for each axis, respectively;

determining if said heading needs updating; and determining if display needs said updated heading transferred thereto.

7. The method of claim 6 further including the step of determining if one calibration cycle has been completed.

8. The autocalibration method of claim 7 wherein said updating calibration step includes the step of comparing a tilt value with a maximum threshold.

9. The autocalibration method of claim 7 wherein said updating calibration values includes the steps of:

testing said sensor readings to validate as true sensor readings;

determining if an X-axis reading is a maximum value for a current calibration cycle of the compass;

determining if said X-axis reading is a minimum value for a current calibration cycle of the compass;

determining if a Y-axis reading is a maximum value for a current calibration cycle of the compass;

determining if said Y-axis reading is a minimum value for a current calibration cycle of the compass;

determining if said X-axis maximum value minus said X-axis minimum is greater than a predetermined minimum spread; and determining if said Y-axis maximum minus said Y-axis minimum is greater than a predetermined minimum spread.

10. The autocalibration method of claim 6 further including the steps of:

calculating a rough azimuth value from said adjusted sensor readings; and determining a second heading from said rough azimuth value.

11. The autocalibration method of claim 10 further including the steps of:

determining with said second heading if eight consecutive cardinal headings have been sensed;

comparing a filtered set of axis calibration values to said set of current calibration cycle's axis values;

updating a calibration counter based on said comparing of said axis values; and updating said calibration axis values with said calibration counter.

12. The autocalibration method of claim 10 wherein said rough azimuth is calculated with every new said offset and without any influence of past readings other than the current cycle.

13. The autocalibration method of claim 6 wherein offset values have the form $$\frac{max+min}{2}.$$

14. The autocalibration method of claim 6 further including the steps of:

calculating current calibration values;

adjusting an X-axis sensor reading by current X-offset and X-scale values; and adjusting a Y-axis sensor reading by current Y-offset and Y-scale values.

15. The autocalibration method of claim 14 wherein said x-scale values and said Y-scale values having a form max–min.

16. The autocalibration method of claim 14 wherein said x-offset and said Y-offset having a form $$\frac{max+min}{2}.$$

17. The autocalibration method of claim 14 further including the steps of:

calculating a raw azimuth value from said adjusted sensor readings;

adjusting said raw azimuth value by a predetermined declination angle; and calculating a filtered azimuth value by filtering with said raw azimuth value.

18. The autocalibration method of claim 17 wherein said filtered azimuth value has the form filtered azimuth+(filtered azimuth−raw azimuth)/K, said filtered azimuth value having a predetermined initial value.

* * * * *

UNITED STATES PATENT AND TRADEMARK OFFICE
CERTIFICATE OF CORRECTION

PATENT NO. : 6,651,003 B2  Page 1 of 1
DATED : November 18, 2003
INVENTOR(S) : Mark Woloszyk et al.

It is certified that error appears in the above-identified patent and that said Letters Patent is hereby corrected as shown below:

Title page,
Item [54], Title, please delete "ELECTRIC" and insert -- ELECTRONIC --.

Column 8,
Line 33, please delete "cat" replace with -- cal --.

Column 10,
Line 51, please delete "cat" replace with -- cal --.

Column 15,
Line 18, please delete "TIGHT LIMIT" replace with -- TIGHT_LIMIT --.

Column 16,
Line 55, please delete "wit" replace with -- with --.

Column 18,
Line 58, please delete "thc" replace with -- the --.

Signed and Sealed this

Twenty-ninth Day of November, 2005

JON W. DUDAS
*Director of the United States Patent and Trademark Office*